Oct. 31, 1939.     W. J. BOWAN     2,178,298
INSERTING TOOL
Filed Oct. 15, 1937
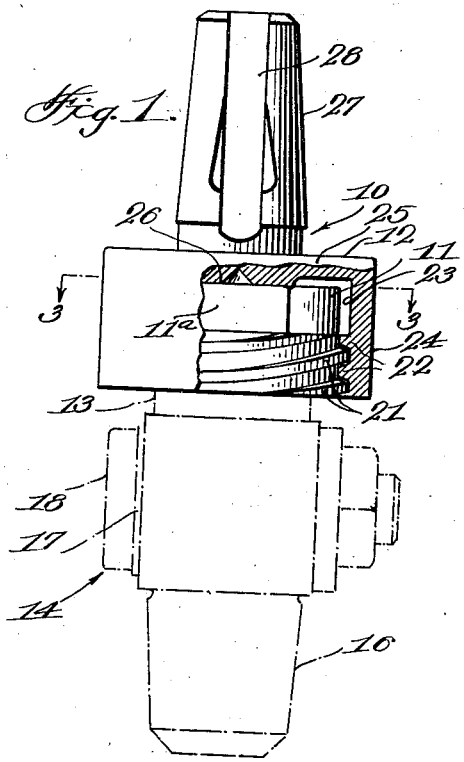
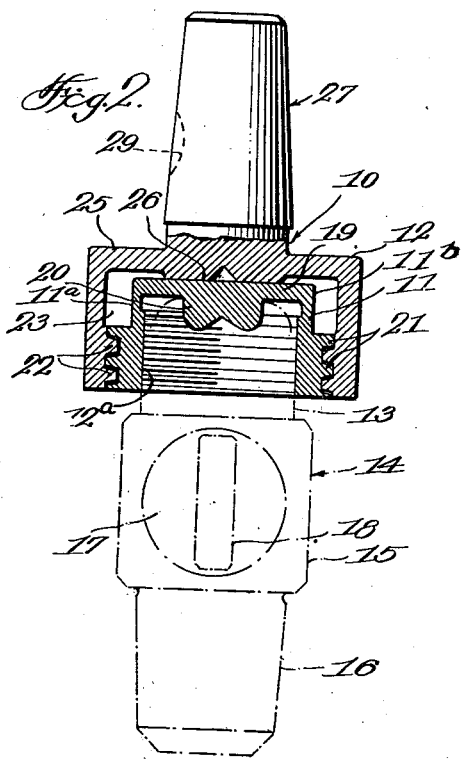
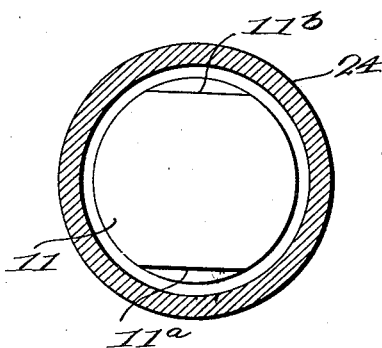
Inventor
Walter J. Bowan Patented Oct. 31, 1939

2,178,298

UNITED STATES PATENT OFFICE 2,178,298

INSERTING TOOL

Walter J. Bowan, Decatur, Ill., assignor to Mueller Co., Decatur, Ill., a corporation of Illinois Application October 15, 1937, Serial No. 169,327

2 Claims. (Cl. 81—53)

The present invention relates to a tool for inserting parts such as corporation stops and the like and has for its purpose to provide a tool which will eliminate the possibility of the parts following the tool when it is sought to remove the latter at the end of the inserting operation.

Ordinarily the stop (contemplated herein as a typical part insertable by the tool of the present invention), in connection with a boring bar through a suitable inserting tool, is lowered through a barrel to be screwed in an opening previously formed in the main. Consequently the connection afforded by the tool must be such as to support the weight of the stop as the stop is lowered. According to the present invention, this function is provided by a connection which is also designed to positively transmit rotation in the threading direction and to separate readily after insertion has been completed so that the boring bar can be lifted away. Other features of the development will be pointed out in the following description of the illustrative embodiment of the new device shown in the accompanying drawing.

In the drawing:

Figure 1 is an elevation of the new tool partly broken away, the tool being shown in applied relation to a stop which appears in dot and dash lines.

Figure 2 includes the parts of Figure 1, the tool being shown in part in elevation and in part in axial section, the tool and stop being shown as turned 45 degrees in a counter-clockwise direction from the position occupied in Figure 1, and Figure 3 is a section substantially on line 3—3 of Figure 1.

Referring to the drawing, the tool generally indicated at 10 includes a core member 11 and a holder member 12. The member 11 is cylindrical in form and provides an axial socket 12a threaded to engage a nipple 13 of a corporation stop 14, the latter including a body 15, a nipple 16 on the opposite side of the body from the nipple 13, and a rotatable plug 17 having a head 18.

Member 11 has a top wall 19 against the inner surface of which the tip end of the nipple abuts when the nipple is fully received in the socket, the wall 19 having a central inner boss 20 in the manner disclosed in Patent No. 1,777,628, issued October 7, 1930, to E. N. Reedy.

Externally member 11 is provided with relatively steep and coarse threads 21 which are engageable with a loose fit with similar threads 22 formed in a socket 23 in the lower radially expanded shell portion 24 of member 12. The inner surface of the top wall 25 of portion 24 is relieved to provide a restricted annular abutment surface 26 for engagement by the top of the wall 19 of member 11 when the latter is fully engaged in socket 23. The top portion of member 11, above threads 21, is flattened on opposite sides to provide parallel faces 11a and 11b which may be engaged by a wrench.

Extending upwardly from portion 24 of member 12 coaxially with socket 23 is a tapered shank 27 which is provided with a longitudinally extending keyway 28 and a set screw seat 29, the shank being engageable in the socket of a boring bar of the type disclosed, for example in Patent No. 1,280,813, issued October 8, 1918, to P. Mueller and A. C. Schuermann.

With the tool parts and stop assembled together as shown in Figures 1 and 2, and associated with the boring bar, the stop may be lowered through the barrel of the boring apparatus, members 11 and 12 being held together through their inter-engaged threads. As the boring bar is turned to screw the stop in the main opening, the upper edge of nipple 13 will be forced tightly against wall 19 and will make a seal therewith since the latter is preferably imperforate. Wall 19 will be pressed against the abutment surface 26 and the plug will be positively screwed to position. At the completion of the inserting operation, the frictional engagement of nipple 16 in the main opening and that of the nipple 13 in the socket 12a will be superior to that of member 11 in the socket 23 in view of large loosely engaged and relatively steep threads 21 and 22 and the reduced abutment surface 26. Consequently member 12 may be unscrewed from member 11 with practically no tendence of the latter or of the stop itself to follow. The boring apparatus may then be dismounted and member 11 removed from the stop while the latter is held against rotation.

Corporation stops have heretofore been insertable only with the plugs in closed position wherein the heads, as at 18, extend transversely. In some of the larger sizes, as for example, 1¼ and 1½ inches, it has been necessary to round off the heads in order that the plugs can be passed through the barrel. It is a feature of the present invention that since the wall 19 of member 11 seals the open end of the nipple 13, the head 18 can be turned to open position wherein it extends axially of the stop body, as shown, and full clearance thus secured without rounding off the head. The latter is thus enabled to retain its preferred rectangular shape which permits it to be most readily engaged by a turning tool.

It is pointed out that the invention is susceptible of varied embodiment and is by no means limited to the disclosure herein, it being only necessary, under the broad aspect of the invention, that a member be provided which is securable to a stop and is in turn retainable by a member adapted to impart threading relation thereto and then to be readily separated therefrom. I do not limit myself to the described form and arrangement of parts except as in the following claims.

I claim:

1. A tool for inserting a corporation stop of the type having a body and threaded nipples projecting from opposite ends of the body, said tool comprising a member having a threaded socket in which one of said nipples has engagement, and a second member for rotating the first and therewith the stop to insert the latter, said first member being externally threaded and said second member having a threaded socket in which the first member is separably engageable with a relatively loose threaded fit upon rotation of the second member in the threading direction of said first member and stop, said first member having an area in abutment with the bottom of the socket of said second member when the members are assembled in operative relation, one of said members being provided with a boss engaging the other member whereby a reduced abutment area is provided, the arrangement being such that the connection between said members will loosen upon reverse rotation of said second member so that the second member may be disconnected from the first and withdrawn without disturbing the engagement of the first member with the stop and without disturbing the set of the inserted stop.

2. A tool for inserting a corporation stop of the type having a body and threaded nipples projecting from opposite ends of the body, said tool comprising a member having a threaded socket in which one of said nipples has engagement, and a second member for rotating the first and therewith the stop to insert the latter, said first member being externally threaded and said second member having a threaded socket in which the first member is separably engageable with a relatively loose threaded fit upon rotation of the second member in the threading direction of said first member and stop, said first member having an area in abutment with the bottom of the socket of said second member when the members are assembled in operative relation, one of said members being provided with a boss engaging the other member whereby a reduced abutment area is provided, the arrangement being such that the connection between said members will loosen upon reverse rotation of said second member so that the second member may be disconnected from the first and withdrawn without disturbing the engagement of the first member with the stop and without disturbing the set of the inserted stop, and said first member having a wall closing said one of said nipples when the latter is engaged in said socket to prevent flow through the stop when the valve plug is in open position.

WALTER J. BOWAN.